Figure 25:
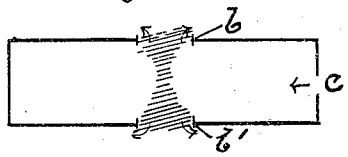

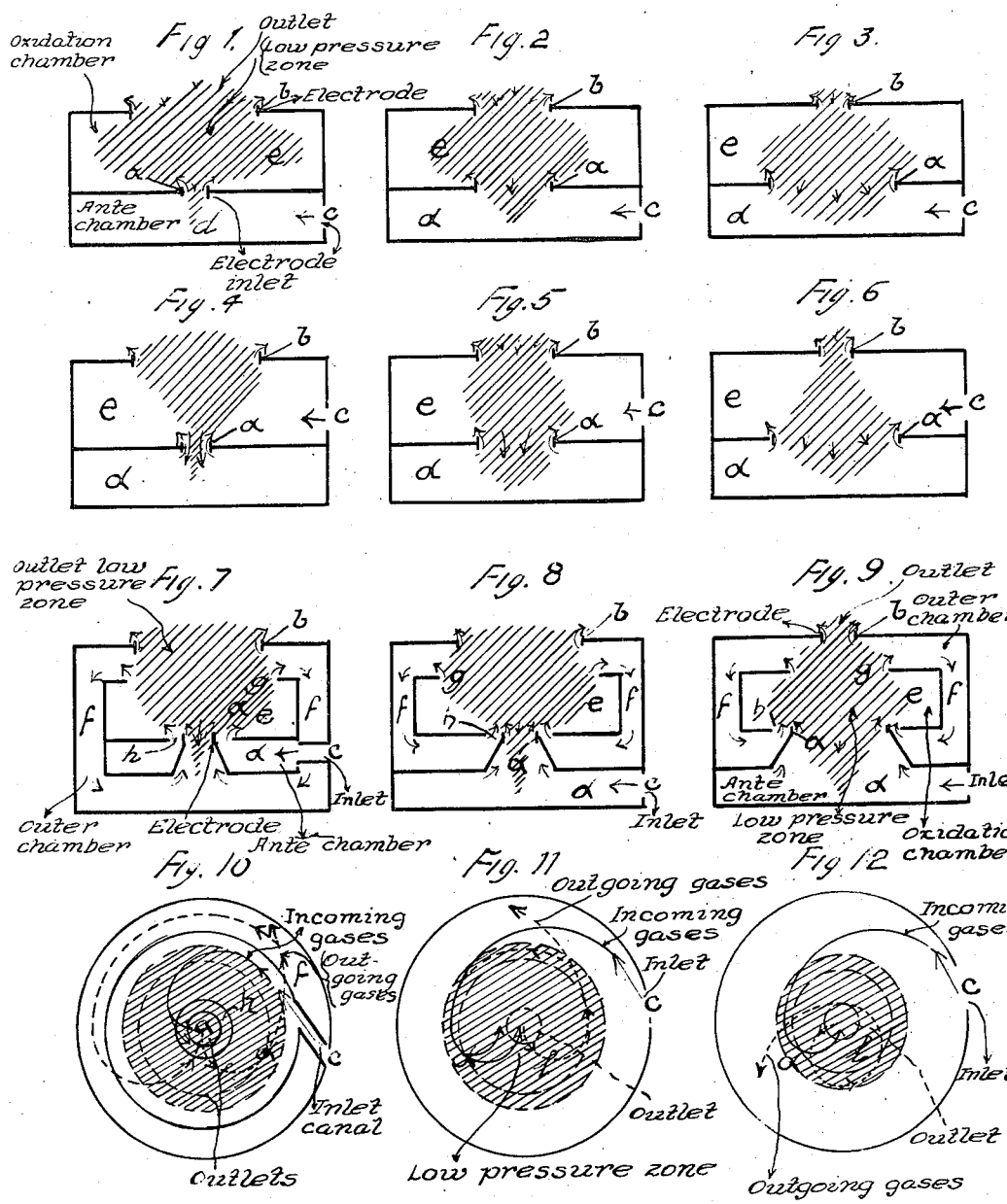

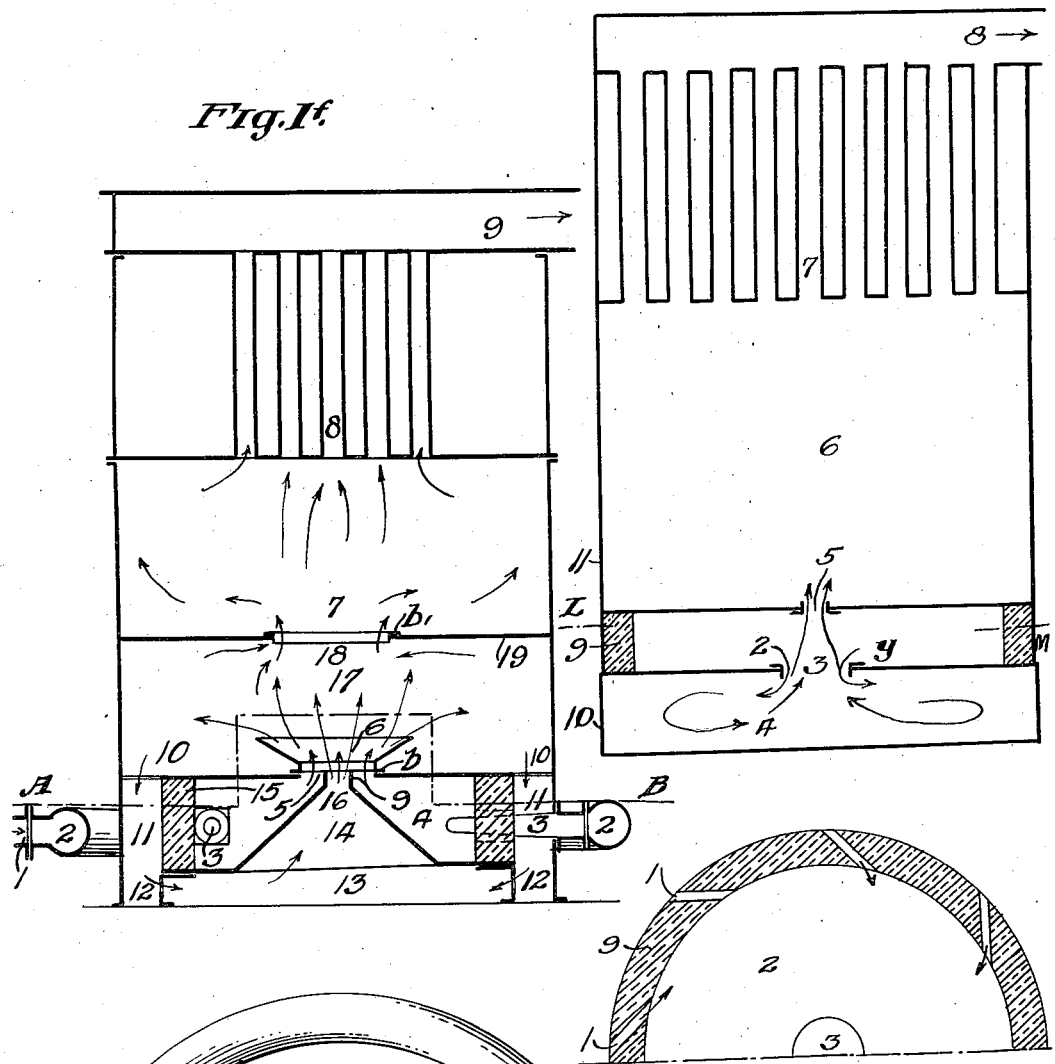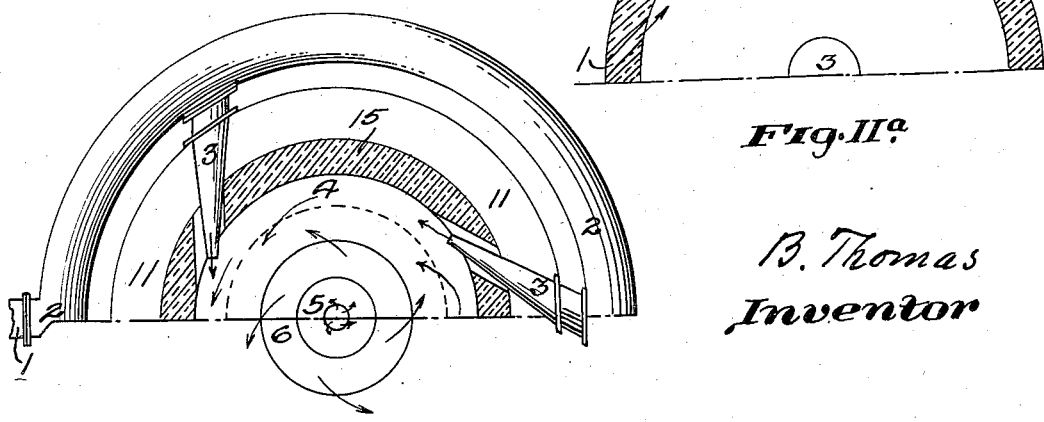

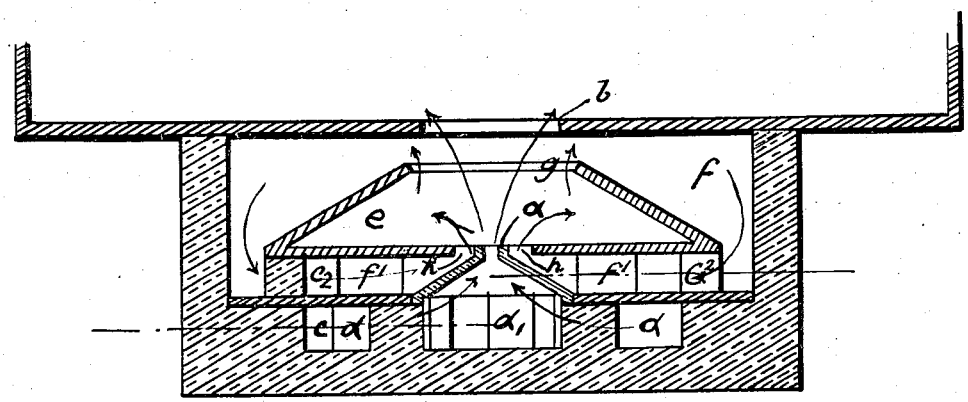
Fig I e
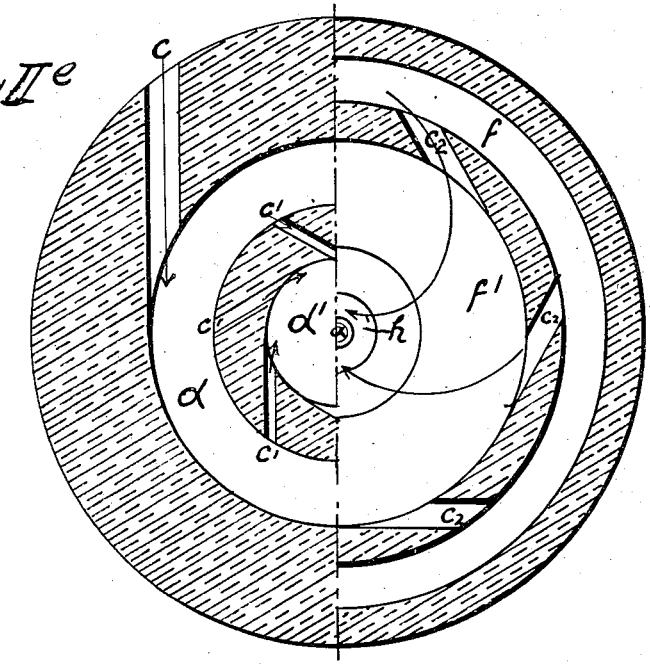
Fig II e
INVENTOR
B. Thomas

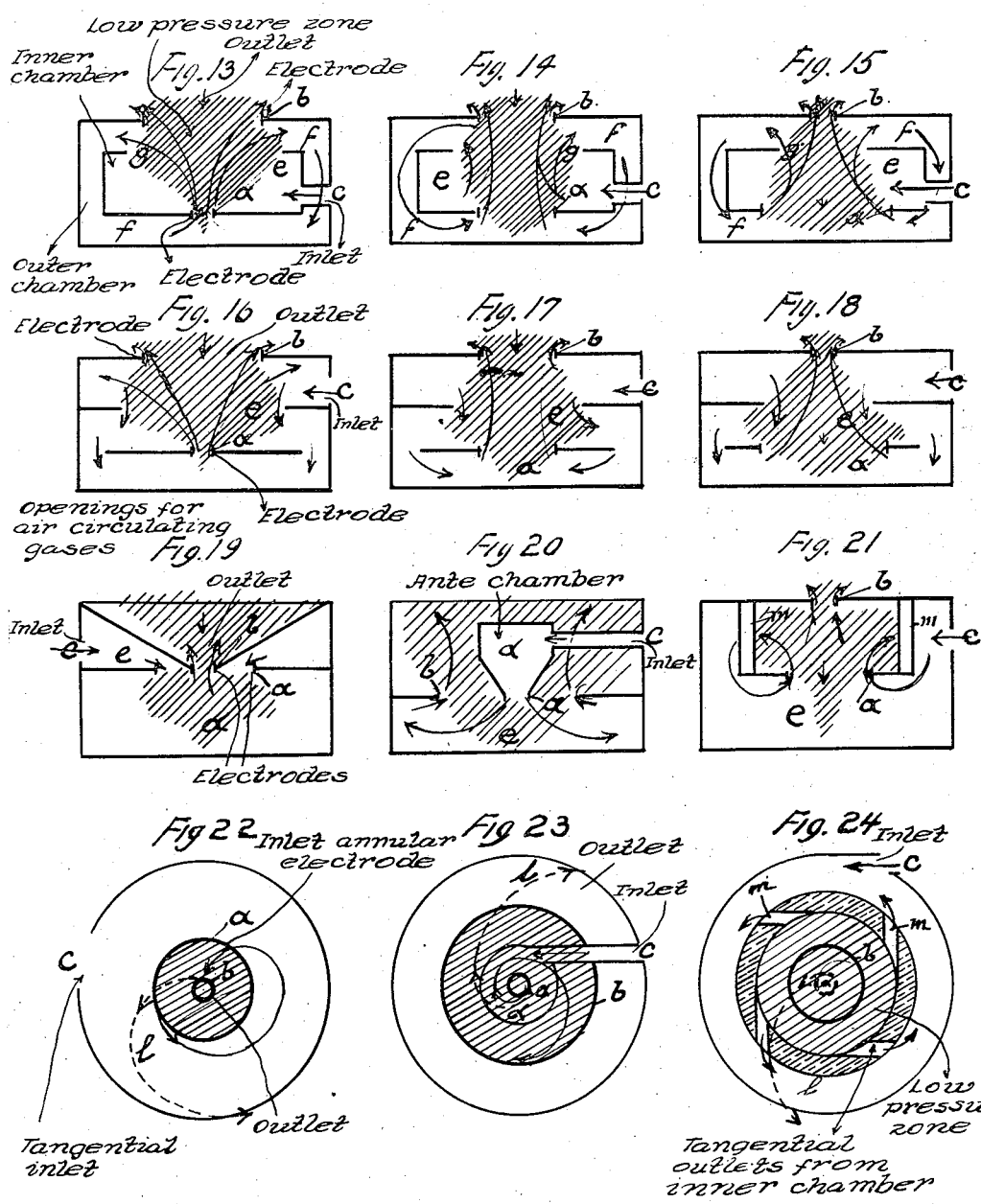

July 5, 1927.                                               1,634,311
                          B. THOMAS
FURNACE FOR ELECTRICAL TREATMENT OF GASES FOR THE PURPOSE OF
OXIDATION OF ATMOSPHERIC NITROGEN OR FOR OTHER PURPOSES
                  Filed March 14, 1923       5 Sheets-Sheet 5

INVENTOR
B. Thomas

Patented July 5, 1927.

1,634,311

UNITED STATES PATENT OFFICE.

BRUNO THOMAS, OF SEATTLE, WASHINGTON.

FURNACE FOR ELECTRICAL TREATMENT OF GASES FOR THE PURPOSE OF OXIDATION OF ATMOSPHERIC NITROGEN OR FOR OTHER PURPOSES.

Application filed March 14, 1923. Serial No. 624,987.

My invention relates to new and useful improvements in furnaces for electrical treatment of gases. More particularly, my invention pertains to those furnaces designed for the purpose of oxidation of atmospheric nitrogen.

The underlying principles of the invention herein set forth are more fully described in my application for United States Letters Patent bearing Serial Number 366,453, filed March 16, 1920.

I will describe and illustrate my furnace as the same pertains to the problems incident to the oxidation of nitrogen. However, it will be understood that my invention is not limited to any such specific purpose, but is co-extensive with all purposes wherein like conditions and like problems arise.

Some of the furnaces heretofore provided for the electrical treatment of gases have tangential admission ports so related to the admission chamber that some centrifugal force may be created therein. However, such force and the relative proportion of the outlet port of said chamber is not such as will create what I term herein a "low pressure zone." The devices mentioned may create a lower pressure axially of the chamber as respects the peripheral portion of the chamber, but the fundamental condition,—namely, of producing a zone of such degree of low pressure that a functional relationship is established with the arc, which may be dispersed therein, that the creation of a high temperature is avoided,—is not provided by said prior art devices.

In the fixation of nitrogen by electrical energy, the following conditions obtain: A primary consideration is the accomplishment of the fixation with as great efficiency as possible. Normally, there obtains in the devices as heretofore designed an oxidation zone of very high temperature, and means provided to cool the port shortly after formation thereof by means of outside cooling air currents. Nitric oxides are characterized chemically by the facility with which they disassociate in an environment of high temperature. Therefore, for the efficient fixation of nitrogen, it is necessary to provide for the prompt removal of the oxides into a cooling zone, without permitting the said oxides to remain in the environment of thermodisassociation temperature, and to provide for the withdrawal of the expanding gases, so that they may be given an opportunity for adiabatic cooling. A primary object of my invention is to provide a furnace which will satisfy these conditions.

Moreover, in said prior art devices the walls are kept as cool as possible by an excess of cooling air. A primary object of my invention is to minimize the necessity of said outside cooling. The general result I have obtained is the conservation of a large amount of electrical energy.

Another object of my invention is to provide a furnace having means to permit the withdrawal of the peripheral portion of the gases in the lower pressure zone, thereby materially assisting in maintaining and developing a stable low pressure zone.

When the gas current rotates in a chamber the lowest pressure will be in the center of the movement. If the rotating gases enter the chamber through a central annular opening the gases will take a centrifugal movement and spread out as far as the centrifugal force will carry them until arrested by the reacting forces from the chamber walls through the air current rotating nearest to the wall. Thus there will be created what in general may be termed two different zones of gases in the chamber; one inner zone, (a centrifugal zone under low pressure), and one outer ring formed zone under higher pressure. The extent of each zone is determined by the size of the chamber and the velocity of the gas current.

A similar division of the rotating gas body may take place also if the air is blown into the chamber tangentially,—only in this case the extent of each zone is mainly determined by the outlet, or outlets, and the design of the chamber. If the chamber is a long narrow tube, there will be no centrifugal zone in the center. There may, of course, be a very small center part of somewhat lower pressure than along the walls, and through this center line the electric energy will pass, forcing its way under high resistance, producing an intense heat and high temperature in the narrow string. The present invention, as will be shown later, will change this condition entirely; and also, with a tangential ingoing gas current create an inside centrifugal zone of sufficient size for the electric energy to work under less resistance, less heat, and less temperature,—all being more favorable conditions for the reaction of the gases.

The above mentioned general objects of my invention, together with others inherent in the same, are attained by the device illustrated in the following drawings, the same being merely preferred exemplary forms of embodiment of my invention, throughout which drawings like reference numerals indicate like parts:

Figures 1-32 are diagrammatic views of portions of an electric furnace embodying my invention, illustrating different positions, forms and arrangement of the admission chamber, reaction chamber, and different sizes of the openings therebetween,—the particular advantages of each being more fully set forth hereinafter;

Fig. I^A is a view in side elevation of a furnace embodying my invention;

Fig. II^A is a view in section on dotted line LM;

Fig. I^B is a view of a modified form of the same;

Fig. II^B is a view in section and as per dotted lines indicated in I^B;

Fig. I^F is a view in elevation of still another modified form of furnace embodying my invention; and Fig. II^F is a view in section on dotted line AB.

Annular electrodes are for gas arcs in many ways preferable to solid electrodes and are illustrated herein. The attacking point, or working surface, is so many times larger, and the rotating gases in a continuous shifting at the attacking point around the periphery, will minimize the destruction of the material. In gas furnaces they have a large advantage by serving as inlets and outlets for the gases, and for this purpose, they are adaptable to such new furnaces designed for centrifugation of the arc and the reaction gases.

In Figs. 1, 2 and 3 is shown an arrangement of two annular electrodes, $a$ and $b$, $a$ serving as inlet, and $b$ as outlet for the gases. The centrifugal movement is provided for by rotating the gases in the ante-chamber $d$ fed through the tangential inlet $c$. When the gases pass from $d$ through $a$, they will immediately adopt a centrifugal movement, the extent of which is determined by the extent of the chamber and the velocity of the gases. Outside the centrifugal air movement, along the walls of the chamber $e$, the same condition will apply as in chamber $a$; this part of the gases will accumulate a centrifugal tension, which will again cause a centrifugal movement of the gases passing through the other electrode $b$ into an outer larger receiving chamber.

There will, then, between the electrodes and for a distance outside the upper electrode, be established a centrifugal zone in which the arc will rotate under a sub-pressure, favorable for oxidation in several ways,—both for the economical utilization of the electrical energy and for the cooling of the arc and the expansion of the gases, which all are conditional factors for an increased efficiency. As shown in the diagrams, the electrodes may be arranged in three different ways: a small bottom electrode and a larger top electrode; two electrodes of equal diameter; or a large diameter bottom-electrode and a small diameter top-electrode. The most favorable arrangement of the three may be determined for each case by the nature of the applied electrical current and by the quantity or the velocity of the gases. A furnace of this art will allow a wide range for both these factors,—their reciprocal proportion determining the grade of concentration.

The lightly shaded section in each diagram indicates the approximate extent of the centrifugal zone, although, as mentioned, it will change with the velocity.

In Figs. 4, 5 and 6 is shown a similar arrangement of the electrodes, with the alteration that the gases from outside here are blown tangentially through $c$ between the electrodes into the chamber $e$, while the underlying chamber $d$ is closed. In this case, a part of the gases from the centrifugal zone in $e$ will pass down through the center of the movement in $a$ into chamber $d$ and come out again along the periphery, and, being mixed with the gases coming in from $c$, will be re-oxidized. The largest amount of re-oxidation will be attained when the bottom electrode $a$ is made the larger one.

In Figs. 7, 8 and 9 is shown an arrangement, whereby the mixing of the gases and the re-oxidation are carried further. In Fig. 7, the chambers $d$ and $e$ are placed inside a larger chamber $f$. The gases from $c$ will pass direct into $d$, where they will rotate and pass through an opening $h$ surrounding the electrode $a$ into chamber $e$, where they will take the centrifugal movement and pass through the opening $g$, placed below, and having a larger diameter than the top electrode $b$. The gases from the larger center part of the centrifugal zone will pass further up and out through the electrode $b$, while the outer layers of the zone will pass between the walls of the chambers, down through $f$ to the bottom and enter chamber $e$ again through the electrode $a$, thereby being intimately mixed with the gases coming in through $h$, and be re-treated. By this arrangement will also be gained that the density of the gases in the periphery of the movement while passing through the electrode $b$, will be minimized, releasing some of the tension of current, thereby saving energy. The same condition applies for $a$.

In Figs. 8 and 9 is shown a slightly different arrangement, by the inlet chamber $d$ being placed below $f$.

Fig. 10 shows a plan of Fig. 7, showing the inlet canal $c$ going through chamber $f$ into chamber $d$, and also the relation of the electrode opening $a$ and the surrounding opening $h$. The full drawn arrow shows the movement of the incoming gases around and into the electrode $a$, while the dotted arrow line shows the centrifugal movement of the mixed gases from both openings in the chamber $e$, outwards and upwards.

In Fig. 11 is shown a plan of Fig. 2 and Fig. 8 with the full drawn arrow indicating the movement of the incoming gases, and the dotted arrow line $l$ indicating the centrifugal movement of the outgoing gases.

In Fig. 12 is shown the plan of chamber $d$ of Figs. 3 and 9 in the same way.

In Figs. 13, 14 and 15 is shown an elimination of the chamber $d$, using only the two chambers $e$ and $f$.

In Figs. 16, 17 and 18 is shown an arrangement of one chamber only, cut up in three compartments by two horizontal partitions,—the upper partition having a large central opening, the lower one an opening around the periphery, besides one in the center for the electrode $a$. The gases come in through $c$ in the upper compartment. They create a centrifugal zone, in the rim of which the density of the outgoing gases is relieved,—thereby that part of the gases pass downward through the larger opening in the upper partition and further through the ring formed opening of the lower partition to the lower compartment, wherefrom they will come back through the electrode $d$ into the centrifugal zone.

In Figs. 19 and 20 are shown the two electrodes, arranged concentric in, or nearly in, the same plane,—Fig. 19, with the gases coming in through the outer electrode $a$ and out through the inner electrode $b$. The largest part of the gases will in this way be re-oxidized. In Fig. 20 the gases are shown coming in through the center electrode $a$ and out through the outer electrode $b$.

In Fig. 21 is shown a ring-formed partition in the upper part of the chamber, the bottom of which carries the electrode $a$ for incoming gases going out through electrode $b$ in the top. The gases are blown in through $c$ between the walls, and will rotate around, go down and come up through $a$. At the same time, the gases in the outer layers of the centrifugal zones between the electrodes will be sucked up through the tangential openings $m$, thereby releasing the tension around the outgoing electrode opening $b$, and at the same time mix with the incoming air and get re-oxidized.

In Fig. 22 is shown a plan of Fig. 19. The air coming in through $c$ with a movement between the electrodes as indicated with the full drawn arrow line, and a full centrifugal movement after passing through $b$ as indicated by the dotted arrow line $l$.

In Fig. 23 is shown a plan of Fig. 20. The full drawn arrow indicates the movement of the gases between $a$ and $b$, and the pointed arrow $l$ the further centrifugal movement passing through $b$.

Fig. 24 is a plan of Fig. 21.

Figure 26:
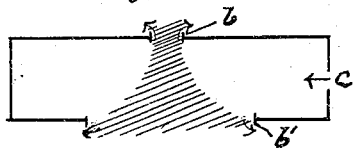

In Figs. 25 and 26 is shown a single chamber through which the air is blown in tangentially through the opening $c$ and out in the center through both electrodes $b$—$b^1$, which electrodes may be of the same diameter as those shown in Fig. 25, or with different diameters, as shown in Fig. 26. In the case of Fig. 25, the centrifugal zone will, in a short chamber and with high air velocity, take the shape of a sand glass, narrow in the middle and wide at the opening, where the pressure is relieved. On account of this pressure difference, the highest tension with highest temperature will be in the middle part of the zone half way between the openings, and from this gas center, in which the middle part of the arc will rotate, each end of the arc will move around one electrode, forming two conical centrifugal zones with separate outlets. The gases from each outlet will, in this case, have the same grade of concentration. If the area of the electrodes is unequal, as in Fig. 26, the centrifugal zone will take the shape of a cone with sides concave towards the axis and two different grades of concentrated gases will follow.

Figure 27:
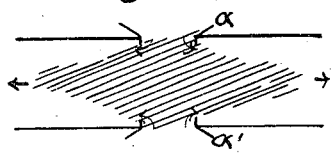
Figure 28:
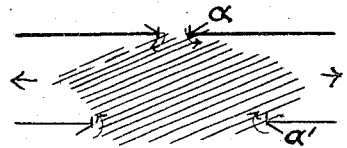

In Figs. 27 and 28 is shown an arrangement where both electrodes serve as inlets, with a tangential or circular outlet. The centrifugal zone will, in both figures, take the form of a round shaped body with convex sides towards the periphery.

Figure 29:
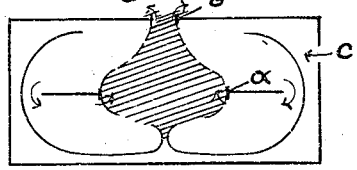
Figure 30:
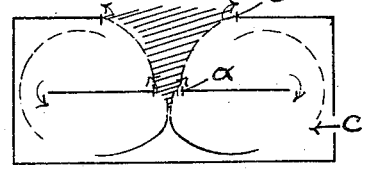

In Figs. 29 and 30 is shown a chamber with a center partition in which the bottom electrode $a$ is placed, and which partition will serve to better the mixing of the gases. The gas inlet $c$ may be placed in the upper or lower part of the chamber.

Figure 31:
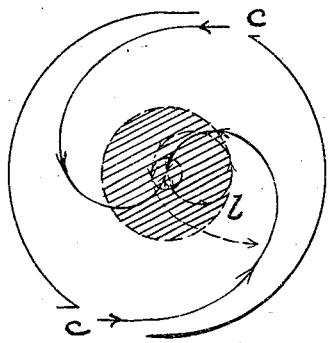
Figure 32:
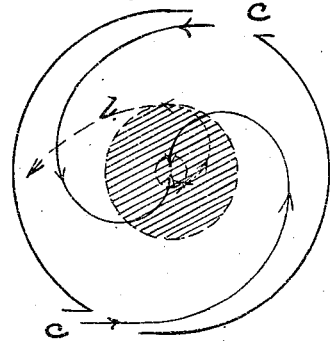

In Figs. 31 and 32 are shown plans of Figs. 29 and 30,—both indicating the tangential gas inlet $c$ and the movement of the incoming gases towards the center—and the outgoing gases from the center, of the centrifugal zone, shown by the full drawn and dotted arrow lines, respectively.

One or both of the annular electrodes may be replaced by a solid center electrode, and the inlets and outlets for the gases arranged thereafter, either around the electrodes or tangentially.

The arc itself will not always fill out the zone. It may hold on to the electrodes with off-shoots or runners, while its main body will seek the center part of the centrifugal zone, and one may notice that the terminals of the arc stay in the axis through the center of the openings, and each end of the arc will, at the upper and lower terminals of the centrifugal action, take the form of a reversed umbrella or as a sprinkler. This phenomenon may be explained thereby that the low pressure in the zone immediately around the axis has transformed the gases into a conductor, spreading and radiating a low temperature gas arc, with off-shoots of higher tension from this gaseous conductor as connecting links with the electrodes. These off-shoots are often of a quite different character than the rest of the arc,—they are concentrated like continuous sparks,—while the rest of the arc is radiating to all sides like a gas sausage. However, the shape of the arc itself, as of the moving zone, will change with the velocity of the gases.

Many other arrangements than here shown may be devised for creating an extended centrifugal working zone for the arc,—the shown diagrams are only used as descriptive illustrations for the basic idea of my invention, for which patent is claimed,—the extended low-pressure centrifugal working zone.

Some further illustration of practical design is shown in the following:

Figs. I$^A$ and II$^A$ show a furnace design according to diagram Fig. 6. The gases are here blown in tangentially through openings $l$ in a chamber with two annular center electrodes $x$ and $y$,—opening 3 in $y$ terminating in a closed chamber 4, while opening 5 in $x$ terminates in a large chamber 6, where the outgoing gases by the centrifugal movement in the large space are cooled down below the dissociation and continue out through tubes 7, and through a final outlet 8. Sucking the gases out from 8, and letting the atmospheric pressure blow them in, the pressure inside the furnace may be regulated to the most favorable condition.

Figs. I$^E$ and II$^E$ show a furnace designed according to diagram Fig. 8. The air comes from the outside through a tangential channel $c$ into a circular chamber $d$ in the lower part of a furnace room built of insulating stone, as sandstone, soapstone, or other insulating materials. From $d$ the air passes in channels $c^1$, through an inside circular wall into a central chamber $d^1$ below the electrode $a$. Having received a movement with a centrifugal tension in chamber $d^1$, the air passes out through $a$ with a centrifugal movement, creating a low pressure centrifugal zone in chamber $e$, which zone continues upward through opening $g$, and the upper electrode $b$ spreading out in a large receiving chamber around $b$. Between openings $g$ and $b$ the outer layers of the gases will break away into the surrounding chamber $f$ and pass downward along the periphery, and through channels $c^2$, enter into chamber $f^1$ above chamber $d$, thereafter pass out through a circular opening $h$ around the electrode $a$, and mix with the air coming into $e$ through $a$, and be reoxidized.

Figs. I$^F$ and II$^F$ show a furnace with an air movement similar to that shown in diagram 7,—the gases for re-oxidation passing in through the center of the direct incoming air. It is a steel furnace resting on an insulating base,—the air coming in through a pipe 1 to a circular pipe 2 around the furnace. From this circular pipe it goes into the furnace through nozzles 3. These nozzles pass through a ring-formed opening 11 between the outer chamber wall and an inside insulating wall 15, separating the conducting plates for the electrodes $a$ and $b$. The nozzles terminate tangentially in the chamber 4, the gases rotate, accumulating a centrifugal tension, and pass out through the opening 5 between the electrodes $a$ and $b$, taking a strong centrifugal movement in the chamber 17, then goes through the center of the partition 19 into chamber 7, where another centrifugal zone will be created, from which the gases will pass through the cooler tubes 8 to the outlet 9. The gases along the wall of chamber 17 will pass downwards through openings 10 into the ring-formed chamber 11 through openings 12 into 13 and 14, and again enter the chamber 17 through the opening 16 in electrode $a$, and mix with the air coming in through 5 between the electrodes $a$ and $b$. There is a third annular electrode $b^1$ in the center of partition 19 around the opening 18. It is on the same circuit as electrode $b$. The arc being started between $a$ and $b$ and the centrifugal zone in the chamber 7 established,—the pressure may be lowered in the center part by increased velocity and for the same reason, the density of the gases around the inner side of $b$ increased,—the arc will then shift its one end from $b$ to $b^1$, and work between $a$ and $b^1$ with increased efficiency.

Obviously, changes may be made in the forms, dimensions, and arrangement of the parts of my invention, without departing from the principle thereof, the above setting forth only preferred forms of embodiment.

I claim:—

1. A furnace for electrical treatment of gases embodying a chamber having tangentially disposed admission ports and an outlet port of such relative size as respects the said chamber that a centrifugal motion is imparted to the gases passing therethrough, whereby a re-action zone of low pressure is produced and electrodes operatively disposed with respect to said zone.

2. A furnace for electrical treatment of gases embodying a gas admission chamber having tangentially disposed inlet ports; an expanding chamber operatively disposed with respect to said admission chamber having an inlet and an outlet port; and electrodes operatively disposed with respect to said inlet and outlet ports, whereby the movement of the gas through said chambers and ports forms a reaction zone of low pressure.

3. A furnace for electrical treatment of gases embodying a gas admission chamber having tangentially disposed inlet ports; an expanding chamber operatively disposed with respect to said admission chamber having an inlet and an outlet port; electrodes operatively disposed with respect to said inlet and outlet ports, whereby the movement of the gas through said chambers and ports forms a reaction zone of low pressure; and a partition disposed between said electrodes, whereby the gases in the peripheral portion of said low pressure zone may be withdrawn.

B. THOMAS.